May 17, 1932.　　W. E. WEAVER　　1,858,723
RESILIENT WHEEL
Filed May 12, 1931

Patented May 17, 1932

1,858,723

UNITED STATES PATENT OFFICE

WALTER E. WEAVER, OF HOUSTON, TEXAS

RESILIENT WHEEL

Application filed May 12, 1931. Serial No. 536,767.

This invention relates to a resilient wheel.

One object of the invention is to provide a wheel of the character described specially designed for use on vehicles, such as motor vehicles, and is of such construction that it may be readily applied to any conventional type of wheel hub and secured to said hub and by the use of which the ordinary pneumatic tire may be dispensed with, if desired, and a solid tire used.

Another object of the invention is to provide a wheel of the character described having a felly and a hub ring maintained in assembled relation by resilient spokes anchored to the hub ring in a novel manner.

With the above and other objects in view, the invention has particular relation to certain novel features of construction arrangement of parts and use, an example of which is given in this specification and illustrated in the accompanying drawings, wherein:—

Figure 1:
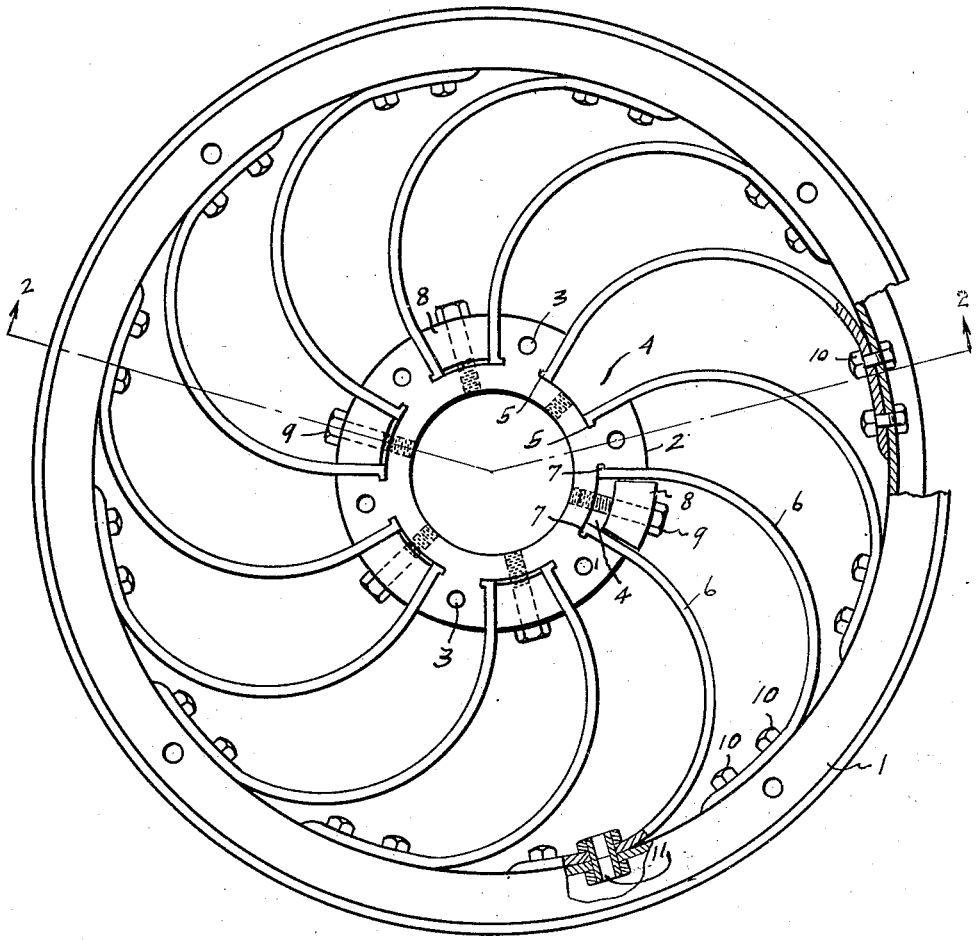
Figure 1 shows a side elevation of the wheel, partly broken away.
Figure 2:
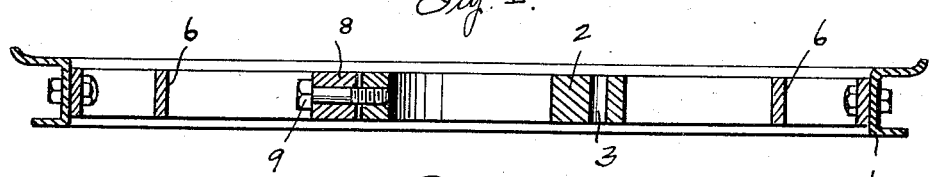
Figure 2 shows a sectional view taken on the line 2—2 of Figure 1.

In the drawings the numeral 1 designates the wheel felly of any selected type. The numeral 2 designates a hub ring shapped to be fitted over a conventional vertical wheel hub and having the bolt holes 3 to receive the securing bolts whereby the hub ring is secured in place on the hub. The hub ring has spaced peripheral pockets 4 having the oppositely disposed grooves 5, 5 at the bottom disposed substantially parallel with the axis of the ring 2. These pockets converge inwardly and the inner ends of the spokes 6 are seated therein and are provided with the beads 7 which fit into the grooves 5. Wedge shaped blocks 8 are fitted into said pockets between the corresponding spokes and are secured in such position by means of the set bolts 9 whose inner ends are threaded into the hub ring 2. These blocks hold the inner ends of the springs securely clamped in place. The spokes 6 are arcuate in form and are flexible and their outer ends lie against the inner side of the felly 1 and are secured thereto by means of suitable bolts 10, 10.

A tire rim with any conventional type of solid or pneumatic tire thereon may be mounted on the felly in any approved manner.

One of the bolts 10 is provided with a bore 11 therethrough, through which the valve stem of the ordinary inner tube may be fitted in case a pneumatic tire is employed.

The drawings and description disclose what is now considered to be a preferred form of the invention by way of illustration only, while the broad principle of the invention will be defined by the appended claim.

What I claim is:

A resilient wheel for detachable mounting on a conventional wheel hub comprising a ring having plane faces and shaped to be fitted over the wheel hub, said ring further having a series of spaced, peripheral, inwardly converging pockets, said pockets having communication with the faces of the ring, the walls of the pockets having transverse grooves in their inner ends, the ring still further having threaded openings extending radially from its inner periphery to the bottoms of the pockets, a felly, resilient, arcuate spokes secured to the felly and having their inner end portions disposed in the pockets in abutting engagement with the walls thereof, ribs on the inner ends of the spokes engaged in the grooves of the pockets, tapered blocks insertable in the pockets between the spokes for anchoring said spokes in the pockets, said blocks having radial openings in alignment with the ring openings, and bolts extending through the blocks and threadedly engaged in the ring openings for securing the blocks in position, the ring still further having a series of smooth openings extending transversely between its faces intermediate the pockets for the passage of bolts for connection with the wheel hub.

In testimony whereof I have signed my name to this specification.

WALTER E. WEAVER.